US008743772B2

(12) United States Patent
Garavaglia et al.

(10) Patent No.: US 8,743,772 B2
(45) Date of Patent: Jun. 3, 2014

(54) MOBILITY LOAD BALANCING AND RESOURCE STATUS REPORT FOR SCENARIOS WITH RELAY NODES

(75) Inventors: Andrea Garavaglia, Nuremberg (DE); Rajat Prakash, San Diego, CA (US); Amer Catovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/250,591

(22) Filed: Sep. 30, 2011

(65) Prior Publication Data
US 2012/0087298 A1 Apr. 12, 2012

Related U.S. Application Data

(60) Provisional application No. 61/388,932, filed on Oct. 1, 2010.

(51) Int. Cl.
| H04W 4/00 | (2009.01) |
| H04B 7/14 | (2006.01) |
| H04W 24/02 | (2009.01) |
| H04W 24/10 | (2009.01) |
| H04B 7/26 | (2006.01) |
| H04W 92/20 | (2009.01) |

(52) U.S. Cl.
CPC ............. *H04W 24/02* (2013.01); *H04W 24/10* (2013.01); *H04B 7/2606* (2013.01); *H04W 92/20* (2013.01)
USPC ........................... 370/315; 370/310; 370/328

(58) Field of Classification Search
CPC ..... H04W 24/02; H04W 24/10; H04W 92/20; H04W 84/047
USPC ......... 370/249, 252, 310, 315, 328, 465, 474; 455/411, 436, 456, 466; 375/222.224
See application file for complete search history.

(56) References Cited

U.S. PATENT DOCUMENTS

| 5,774,456 | A | 6/1998 | Ellebracht et al. |
| 5,774,465 | A * | 6/1998 | Lau et al. ................... 370/395.3 |
| 2009/0088165 | A1 * | 4/2009 | Shen et al. ................... 455/436 |
| 2009/0202239 | A1 * | 8/2009 | Holness et al. ............... 398/33 |
| 2009/0233618 | A1 * | 9/2009 | Bai et al. ....................... 455/453 |
| 2010/0173626 | A1 * | 7/2010 | Catovic et al. ................ 455/423 |
| 2011/0044279 | A1 | 2/2011 | Johansson et al. |
| 2012/0163287 | A1 * | 6/2012 | Raaf et al. ...................... 370/315 |

FOREIGN PATENT DOCUMENTS

| CN | 101964986 A | 2/2011 |
| WO | WO2010086023 A1 | 8/2010 |
| WO | WO2010145710 A1 | 12/2010 |

OTHER PUBLICATIONS

Huawei et al.: "Relay non-UE-associate X2 messages handling", 3GPP Draft; R3-102048, Aug. 15, 2010.*
Nokia Siemens Networks: "Discussion of Mobile Load Balancing for Relay", R3-102367, Aug. 15, 2010.*

(Continued)

*Primary Examiner* — Afsar M Qureshi
(74) *Attorney, Agent, or Firm* — Patterson & Sheridan, L.L.P.

(57) ABSTRACT

Certain aspects of the present disclosure provide techniques and apparatuses for wireless communications. The techniques generally include intercepting a report message from a relay node destined for a target base station, modifying the report message based on information not available at the relay node, and sending the modified report message to the target base station.

36 Claims, 7 Drawing Sheets

(56) References Cited

OTHER PUBLICATIONS

International Search Report and Written Opinion—PCT/US2011/054492—ISA/EPO—Jan. 12, 2012.
Nokia Siemens Networks, "Discussion of Mobile Load Balancing for Relay," R3-102367, 3GPP TSG-RAN WG3 Meeting #69, Madrid, Spain, Aug. 23-27, 2010, 2 pages.
Braun, V. et al. (Feb. 2011). "Relay Networks Specific Resource Management Features." pp. 1-87. Retrieved from https://ict-artist4g.eu/project/work-packages/wp3/internal-reports-deliverables/d3.3/d3.3-v2.0-pdf-version: See Sections 2.3 and 3.1.1.
(Jun. 2011). LTE; Evolved Universal Terrestrial Radio Access (E-UTRA) and Evolved Universal Terrestrial Radio Access Network (E-UTRAN); Overall Description; Stage 2. 3GPP TS 36.300 version 10.4.0 Release 10, ETSI TS 136 300 V10.4.0, pp. 1-207. Retrieved from https://www.etsi.org/deliver/etsi ts/136300 136399/136300/10.04.00 60/ts 136300v100400p.pdf: See Sections 4.7.4, 20.2.2.10, and 20.2.2.11.
Huawei et al: "Relay non UE-associated X2 messages handling", 3GPP Draft; R3-102048 Non UE Associated X2 MMG Handling, 3rd Generation Partnership Project (3GPP), Mobile Competence Center; 650, Route Des Lucioles; F-06921 Sophia-Antipolis Cedex; France, vol. RAN WG3, no. Madrid, Spain; 20100823, Aug. 15, 2010, XP 050452939, [retrieved on Aug. 15, 2010], paragraph [3.2.2].
Huawei: "X2 interface analysis for relay", 3GPP Draft; R3-092190, 3rd Generation Partnership Project (3GPP), Mobile Competence Center; 650, Route Des Lucioles; F-06921 Sophia-Antipolis Cedex; France, no. Miyazaki; 20091012, Oct. 12, 2009, XP050391740, [retrieved on Oct. 2, 2009], the whole document.
Qualcomm Incorporated: "Mobility Load Balancing in case of relay nodes", 3GPP Draft; R3-102911; 3rd Generation Partnership Project (3GPP), Mobile Competence Center; 650, Route Des Lucioles; F-06921 Sophia-Antipolis Cedex; France, vol. RAN WG3, no. Xi'an; 20101011, Oct. 2, 2010, XP 050453706, [retrieved on Oct. 2, 2010], paragraph [0002].
PCT Invitation to Pay Additional Fees and, where applicable, Protest Fee, for International Application No. PCT/2011/054492, dated Nov. 24, 2011.

* cited by examiner

RESOURCE STATUS UPDATE MESSAGE

MOBILITY LOAD BALANCING AND RESOURCE STATUS REPORT FOR SCENARIOS WITH RELAY NODES

CLAIM OF PRIORITY UNDER 35 U.S.C. §119

The present application for patent claims priority to Provisional Application No. 61/388,932, entitled "Mobility Load Balancing and Resource Status Report for Scenarios with Relay Nodes," filed Oct. 1, 2010, and assigned to the assignee hereof and hereby expressly incorporated by reference herein.

BACKGROUND

1. Technical Field

Certain aspects of the present disclosure generally relate to wireless communications and, more particularly, to resource status report for relay nodes.

2. Background

The third Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 50 megabits per second (Mbps) and a downlink speed of up to 100 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum. The LTE is also expected to improve spectral efficiency in 3G networks, allowing carriers to provide more data and voice services over a given bandwidth. The LTE encompasses high-speed data, multimedia unicast and multimedia broadcast services.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier—Frequency Division Multiple Access (SC-FDMA) on the uplink (UL). OFDMA allows data to be directed to or from multiple users on a subcarrier-by-subcarrier basis for a specified number of symbol periods.

The LTE-Advanced is an evolving mobile communication standard for providing 4G services. Being defined as 3G technology, the LTE does not meet the requirements for 4G also called International Mobile Telecommunications-Advanced (IMT-Advanced) as defined by the International Telecommunication Union such as peak data rates up to 1 Gbit/s. Besides the peak data rate, the LTE-Advanced also targets faster switching between power states and improved performance at the cell edge.

Wireless communication systems may comprise a donor base station that communicates with wireless terminals via a relay node (e.g., relay base station). The relay node may communicate with the donor base station via a backhaul link and with the terminals via an access link. In other words, the relay node may receive downlink messages from the donor base station over the backhaul link and relay these messages to the wireless terminals over the access link. Similarly, the relay node may receive uplink messages from the wireless terminals over the access link and relay these messages to the donor base station over the backhaul link. The relay node may, thus, be used to supplement a coverage area and help fill "coverage holes."

SUMMARY

Certain aspects of the present disclosure provide a method for wireless communications. The method generally includes intercepting a report message from a relay node destined for a target base station, modifying the report message based on information not available at the relay node, and sending the modified report message to the target base station.

Certain aspects of the present disclosure provide a method for wireless communications. The method generally includes generating a report message at a relay node, determining whether or not to include one or more parameters in the report message that are calculated based on information not available at the relay node, and transmitting the report message.

Certain aspects of the present disclosure provide an apparatus for wireless communications. The apparatus generally includes means for intercepting a report message from a relay node destined for a target base station, means for modifying the report message based on information not available at the relay node, and means for sending the modified report message to the target base station.

Certain aspects of the present disclosure provide an apparatus for wireless communications. The apparatus generally includes means for generating a report message at the apparatus, means for determining whether or not to include one or more parameters in the report message that are calculated based on information not available at the apparatus, and means for transmitting the report message.

Certain aspects provide a computer-program product for wireless communications, comprising a computer-readable medium having instructions stored thereon, the instructions being executable by one or more processors. The instructions generally include instructions for intercepting a report message from a relay node destined for a target base station, instructions for modifying the report message based on information not available at the relay node, and instructions for sending the modified report message to the target base station.

Certain aspects provide a computer-program product for wireless communications, comprising a computer-readable medium having instructions stored thereon, the instructions being executable by one or more processors. The instructions generally include instructions for generating a report message at a relay node, instructions for determining whether or not to include one or more parameters in the report message that are calculated based on information not available at the relay node, and instructions for transmitting the report message.

Certain aspects of the present disclosure provide an apparatus for wireless communications. The apparatus generally includes at least one processor and a memory coupled to the at least one processor. The at least one processor configured to intercept a report message from a relay node destined for a target base station, modify the report message based on information not available at the relay node, and send the modified report message to the target base station.

Certain aspects of the present disclosure provide an apparatus for wireless communications. The apparatus generally includes at least one processor and a memory coupled to the at least one processor. The at least one processor configured to generate a report message at the apparatus, determine whether or not to include one or more parameters in the report message that are calculated based on information not available at the apparatus, and transmit the report message, and a memory coupled to the at least one processor.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
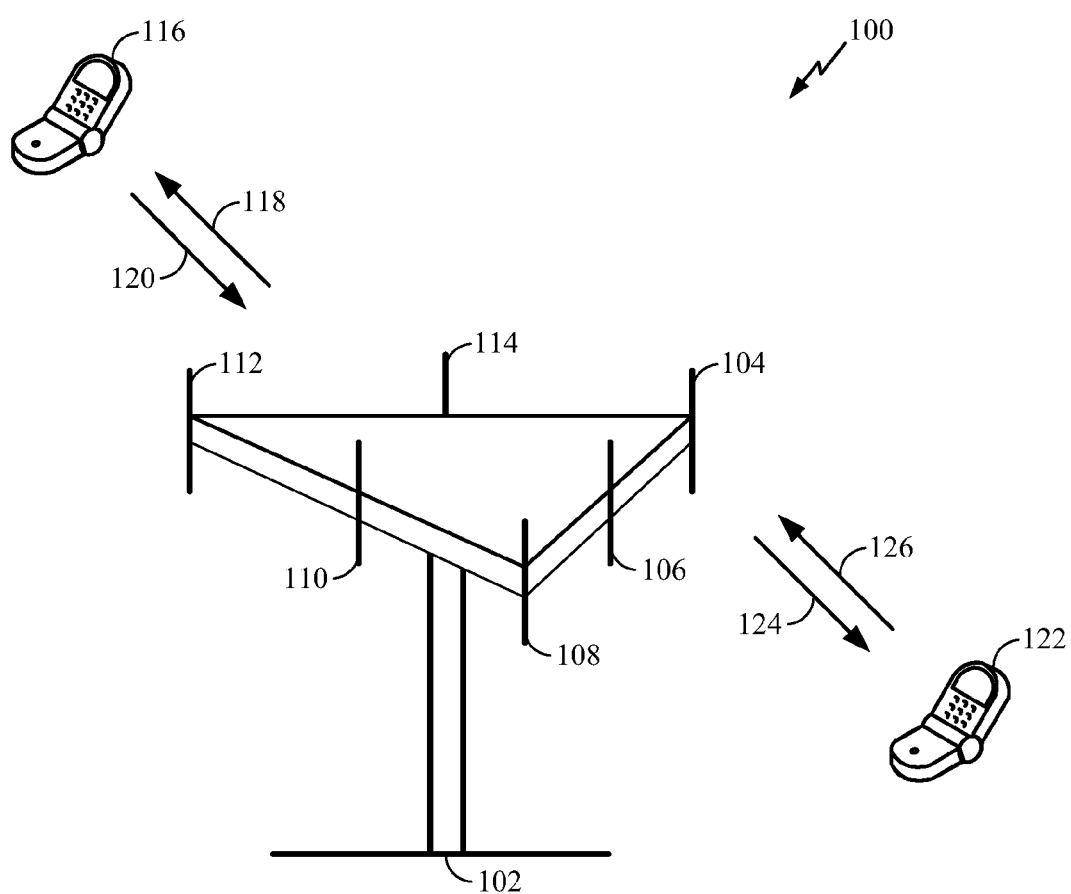
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It may be evident; however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), The Institute of Electrical and Electronics Engineers (IEEE) 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below. It should be noted that the LTE terminology is used by way of illustration and the scope of the disclosure is not limited to LTE.

Single carrier frequency division multiple access (SC-FDMA), which utilizes single carrier modulation and frequency domain equalization has similar performance and essentially the same overall complexity as those of an OFDMA system. SC-FDMA signal may have lower peak-toaverage power ratio (PAPR) because of its inherent single carrier structure. SC-FDMA may be used in the uplink communications where lower PAPR greatly benefits the mobile terminal in terms of transmit power efficiency. SC-FDMA is currently a working assumption for uplink multiple access scheme in 3GPP Long Term Evolution (LTE), or Evolved UTRA.

Referring to FIG. 1, a multiple access wireless communication system 100 according to one aspect is illustrated. An access point 102 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 118 and receive information from access terminal 116 over reverse link 120. Access terminal 122 is in communication with antennas 104 and 106, where antennas 104 and 106 transmit information to access terminal 122 over forward link 124 and receive information from access terminal 122 over reverse link 126. In a Frequency Division Duplex (FDD) system, communication links 118, 120, 124 and 126 may use a different frequency for communication. For example, forward link 118 may use a different frequency than that used by reverse link 120.

Each group of antennas and/or the area in which they are designed to communicate is often referred to as a sector of the access point. In an aspect, antenna groups each are designed to communicate to access terminals in a sector of the areas covered by access point 102.

In communication over forward links 118 and 124, the transmitting antennas of access point 102 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as a Node B, an evolved Node B (eNB), or some other terminology. An access terminal may also be called a mobile station, user equipment (UE), a wireless communication device, terminal, or some other terminology.

Figure 2:
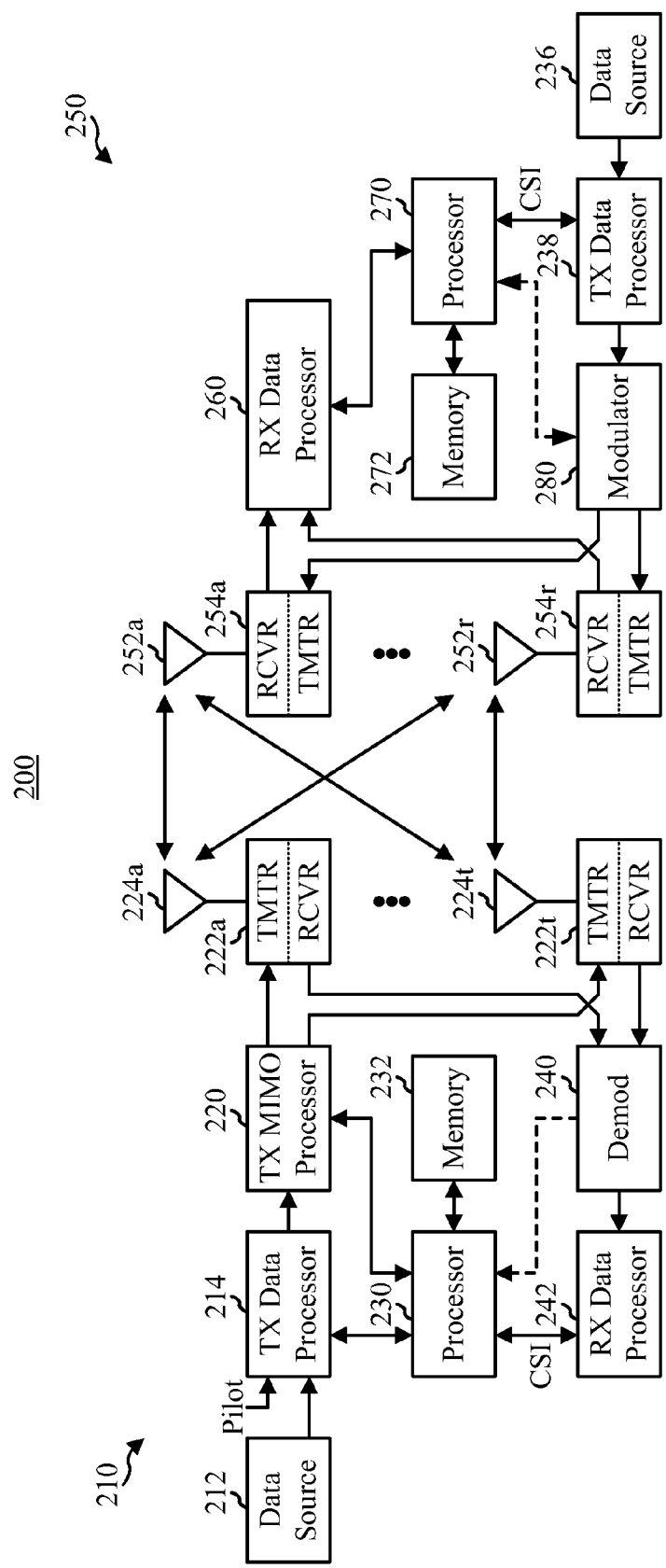
FIG. 2 illustrates a block diagram of multiple input multiple output (MIMO) communication system, in accordance with certain aspects of the present disclosure.

FIG. 2 is a block diagram of an aspect of a transmitter system 210 and a receiver system 250 in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M may be a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data for the data stream. The processing by RX data processor 260 is complementary to that performed by TX MIMO processor 220 and TX data processor 214 at transmitter system 210. As described in further detail below, the RX data processor 260 may calculate a metric and dynamically select a channel estimation mode based on the metric.

Processor 270, coupled to a memory 272, formulates a reverse link message. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240 and processed by a RX data processor 242 to extract the reserve link message transmitted by the receiver system 250.

An Example Relay System

Relay nodes may be mobile network base stations, which may connect to a radio network via an in-band wireless backhaul link instead of using a dedicated wired or wireless backhaul link, such as Ethernet or microwave link. For In-band relaying, the same radio resources may be used by relay nodes and user equipments (UEs). The relay nodes may provide coverage extension to regions of high shadowing (including indoor areas) or locations where dedicated backhaul links are not (or cannot be) deployed.

In an LTE network, relaying functionality may be provided by relay nodes (RNs). A relay node may connect to a base station (e.g., an eNB), which may be referred to as the Donor base station (DeNB) for that particular relay node. Communication between the relay node and the network may be performed via the donor base station. A radio link between the relay node and the donor base station may be called a backhaul link, which may utilize the Un interface. The Un interface is an interface in LTE specifically designed for RN-DeNB backhaul communication. Mobile terminals may connect either directly to a base station or to a relay node, via access links that utilize Uu interface.

Figure 3:
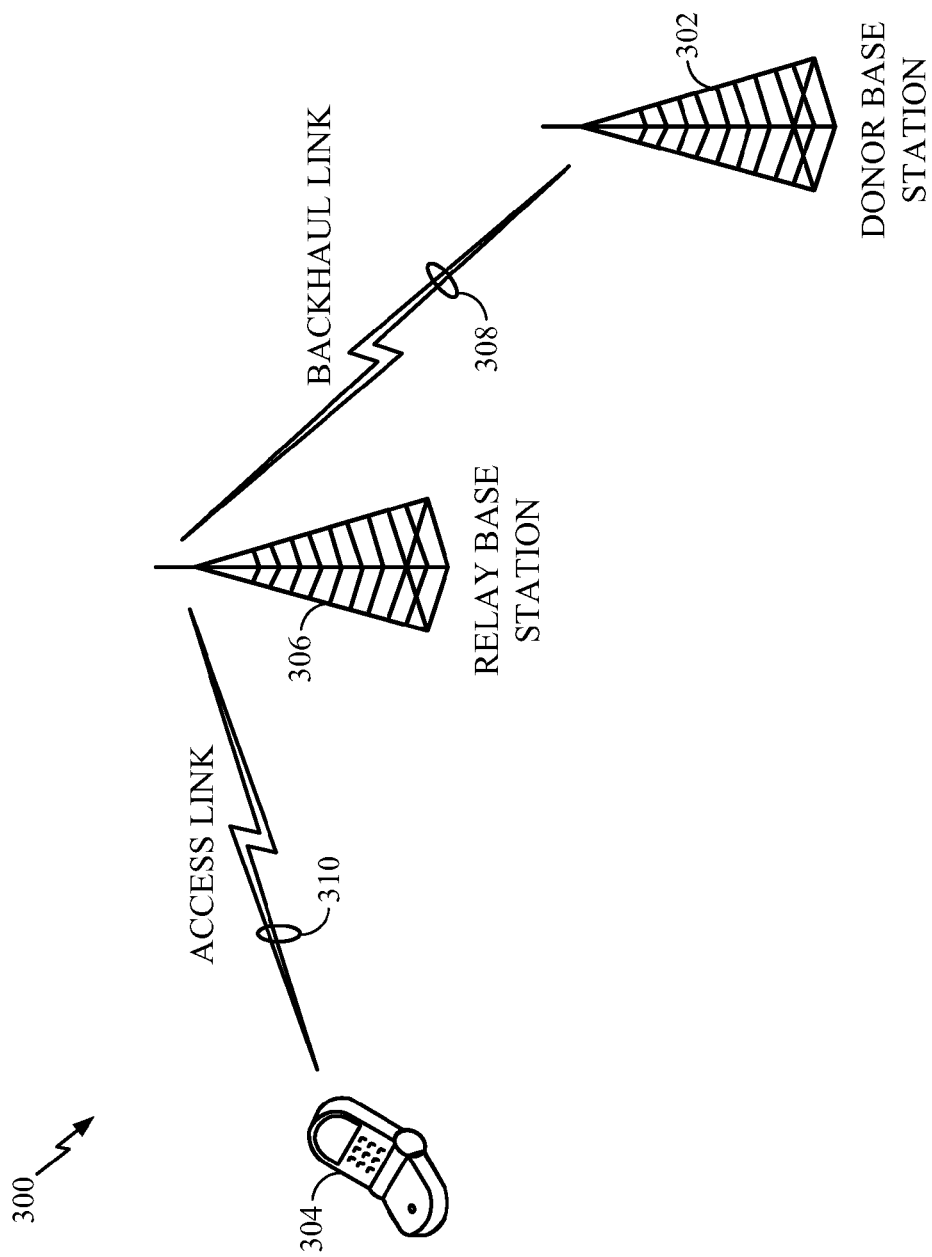
FIG. 3 illustrates an exemplary wireless communications system with a relay node, in accordance with certain aspects of the present disclosure.

FIG. 3 illustrates an example wireless system 300 in which certain aspects of the present disclosure may be practiced. As illustrated, the system 300 includes a donor base station (BS) 302 that communicates with a UE 304 via a relay BS 306. The relay base station 306 may communicate with the donor BS 302 via a wireless backhaul link 308 and with the UE 304 via an access link 310.

While a relay BS is shown in FIG. 3, those skilled in the art will appreciate that the techniques presented herein may be applied to any type of device acting as a relay node, including a user equipment (UE) acting as a relay between a donor base station and other UEs.

The relay base station 306 may receive downlink messages from the donor BS 302 over the backhaul link 308 and relay these messages to the UE 304 over the access link 310. Similarly, the relay BS 306 may receive uplink messages from the UE 304 over the access link 310 and relay these messages to the donor BS 302 over the backhaul link 308.

The relay base station 306 may, thus, be used to supplement a coverage area and help fill "coverage holes." According to certain aspects, a relay BS 306 may appear to a UE 304 as a conventional BS. According to other aspects, certain types of UEs may recognize a relay BS as such, which may enable certain features.

Mobility Load Balancing and Resource Status Report for Scenarios with Relay Nodes Certain aspects of the present disclosure propose a method for reporting resource usage of a relay node to other neighboring nodes. The proposed method utilizes a donor base station to facilitate the resource status reporting. The donor base station may receive a resource status report from a relay node, intercept the resource status message and modify/update the message based on the knowledge not available at the relay node.

Mobility load balancing (MLB) is one of many important features of self-organizing networks (SONs). The MLB feature may be used to balance loads of different neighboring eNBs. MLB may rely on resource status messages that are exchanged between neighboring eNBs over the X2 interface. Resource status messages of neighbor eNBs may be used by an eNB to judge whether or not MLB procedures should be executed. As a result, one or more UEs may handover between eNBs to balance load of the eNBs.

In order to support the MLB for relay node deployments, relay nodes may also exchange resource status with their neighbors via their backhaul link 308. However, the backhaul link 308 that connects the relay node to the donor base station may utilize a wireless link that may vary with time depending on the relay node as well as the donor base station 302. Therefore, it may be difficult for the relay node (e.g., relay base station 306) to provide correct assessments of its available resources.

Certain aspects of the present disclosure, however, may be utilized in an effort to provide more accurate and complete assessments of available resources. By intercepting a report message transmitted from a relay node (e.g., relay base station or relay UE) to a target base station, a donor base station may be able to supplement (or correct) information in the report using information that may not be available at the relay node.

Figure 4:
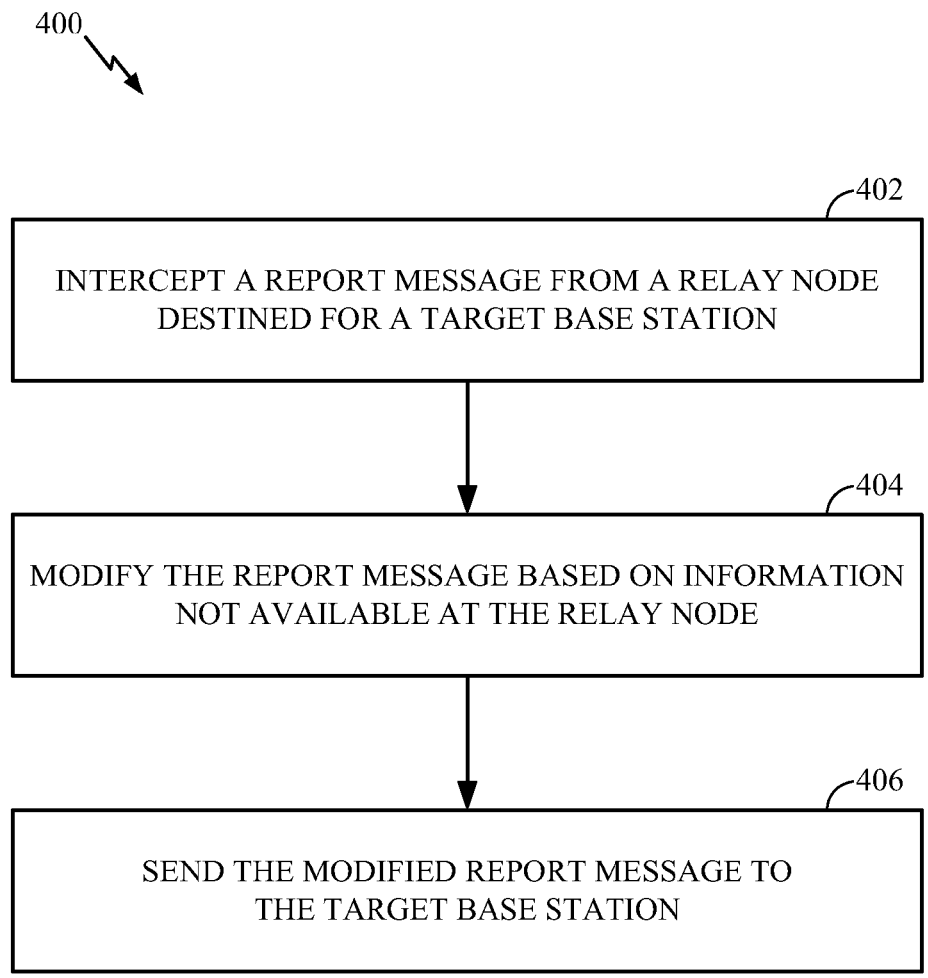
FIG. 4 illustrates example operations that may be performed by a donor base station to send a resource status report of a relay node to a target base station, in accordance with certain aspects of the present disclosure.

FIG. 4 illustrates example operations 400 that may be performed, for example, by a donor base station, to help provide a target base station with more accurate and complete information.

At 402, the donor base station may intercept a report message from a relay node destined for a target base station. At 404, the donor base station may modify the report message based on information not available at the relay node. At 406, the donor base station may send the modified report message to the target base station.

Figure 5:
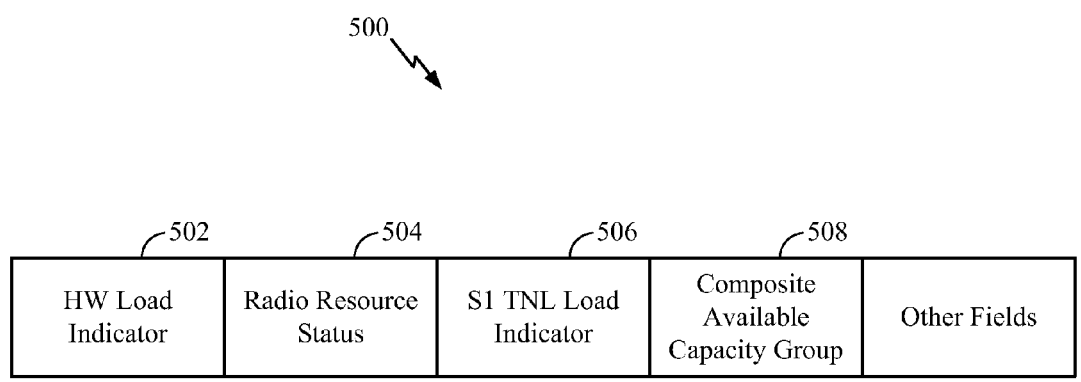
FIG. 5 illustrates an example format for resource status update message, in accordance with certain aspects of the present disclosure.

FIG. 5 illustrates an example format for resource status update message, in accordance with certain aspects of the present disclosure. As illustrated, the resource status update message may include a Hardware (HW) Load Indicator 502, a Radio Resource Status 504, a S1 Transport Network Layer (TNL) Load Indicator field 506, a Composite Available Capacity Group field 508 and one or more other fields.

The HW Load Indicator 502 may indicate status of the hardware load experienced by a cell (e.g., a base station or a relay base station). The Radio Resource Status may indicate the usage of the physical resource blocks (PRBs) in downlink and uplink of the cell. The S1 TNL Load Indicator field may indicate the status of the S1 transport network load experienced by a cell, and the Composite Available Capacity Group field may indicate the overall available resource level in the cell in downlink and uplink.

One of the important inputs in calculation of S1 TNL Load Indicator and Composite Available Capacity Group at the eNB may be resource status of the backhaul link of the eNB. The calculation may be straightforward for an eNB since the eNB has full control and knowledge about its backhaul utilization.

However, in relay node deployments, the control over the DeNB-RN link is located at the donor base station and not at the relay node. Therefore, the relay node may not have enough knowledge about unused resources that are available for the relay node's dedicated backhaul link (e.g., dedicated Un link for the relay base station).

Figure 6:
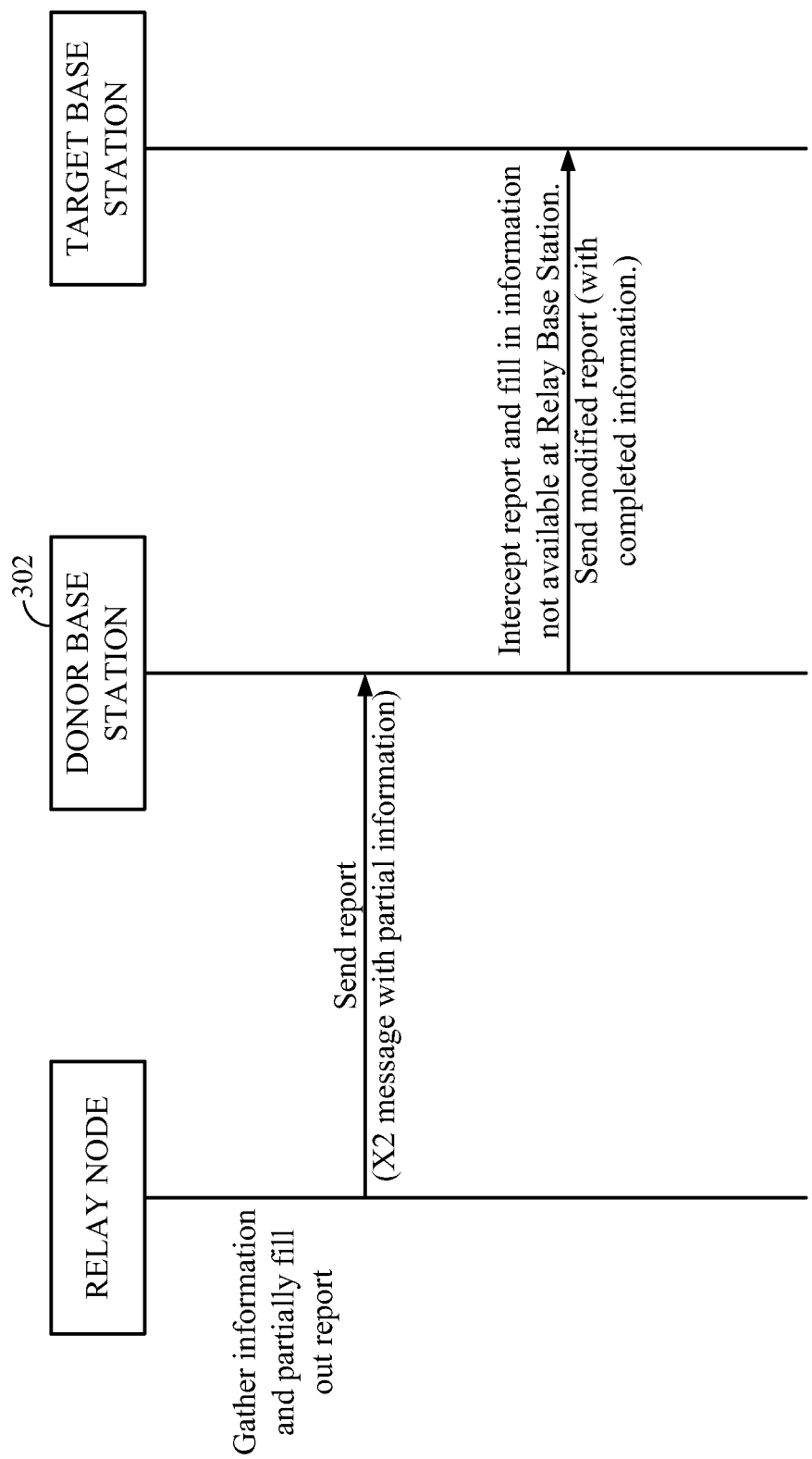
FIG. 6 illustrates the interactions between a relay node, a donor base station, and a target base station, in accordance with certain aspects of the present disclosure.

FIG. 6 illustrates an example exchange of messages corresponding to the operations 400 shown in FIG. 4. As illustrated, a relay node may gather information (e.g., in response to a request about its available resource), and fill up various fields of the parameters defined for the Resource Status report message 500 based on its available knowledge.

In some aspects, the relay node may be able to correctly estimate the Hardware Load Indicator and the Radio Resource Status and fill them up in the Resource Status Update message. In some aspects, the relay node may not be able to estimate the S1 TNL Load Indicator field and therefore the relay node may leave the S1 TNL Load Indicator field empty or fill it up with partial information.

The relay node may also fill up the Composite Available Capacity Group field considering only the resources of which the relay node is fully aware. In some aspects, the relay node may fill up the Composite Available Capacity Group field considering only the uplink loading and the downlink loading.

For certain aspects, the relay node may not consider capacity constraints for the backhaul in calculating the Composite Available Capacity Group indicator (e.g., the relay node may assume that the backhaul has full capacity or no loading). The relay node may send the resource status update message (including the Composite Available Capacity Group indicator) to a donor base station. The donor base station, which may provide an X2 proxy function for the relay node, may send the resource status update message with this partial (or partially accurate) information to a target base station.

For certain aspects, the donor base station may intercept the resource status update message through its X2 proxy function. Therefore, the donor base station may be able to access all the messages the relay node exchanges over X2 with other base stations (e.g., including the resource status update message). In some aspects, the donor base station may add missing information (or modify information), based on information the donor base station has that is not available to the relay node, before forwarding the message to the target base station. For example, the donor base station may modify the value in a S1 TNL Load Indicator field in a status report message. As an alternative, the donor base station may fill-up a S1 TNL Load Indicator field based on its available information.

In some cases, the donor base station may have complete knowledge about the backhaul link provided to the relay node and the related allocated resources and loading. As an example, the donor base station may fill up the S1 TNL Load Indicator field in the Resource Status Update message sent by the relay node. The donor base station may fill in information in the Resource Status Update message because the donor base station may have accurate knowledge about the backhaul link that is assigned to the relay node.

For certain aspects, the donor base station may also adjust the Composite Available Capacity Group field in the resource status update message sent by the relay node before proxying it to the target base station. The donor base station may include loading information related to the backhaul link in the message sent by the relay node before proxying the resource status update message to the target base station. Therefore, the donor base station may send a modified resource status report with more complete information to the target base station.

For example, a relay node may report the Capacity Value information element (IE) corresponding to the strictest of the constraints among loads of uplink, downlink or backhaul link. However, the relay node may make the calculation considering only uplink load and downlink load without considering the backhaul link in the estimate. The donor base station may then update the Capacity Value IE to a lower value (e.g., less capacity available) if the backhaul link points to further restrictions, or leave the Capacity Value IE unchanged if the backhaul link has more available resources.

Figure 7:
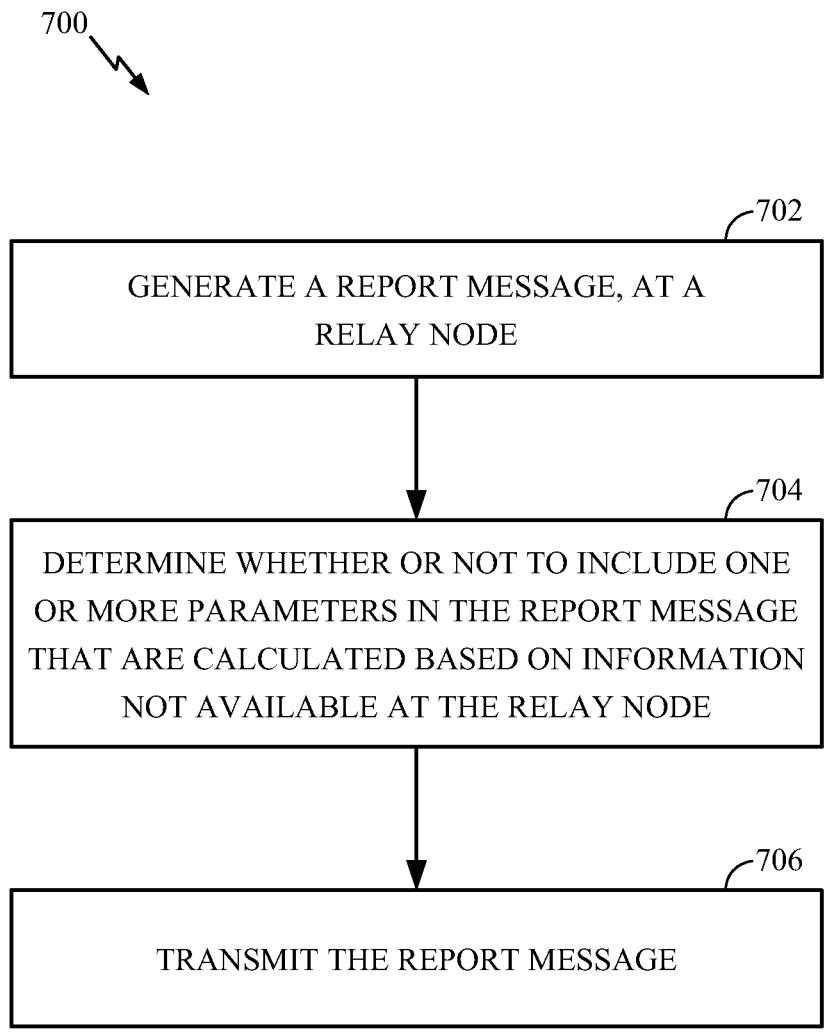
FIG. 7 illustrates example operations that may be performed by a relay node to send a resource status update message to a target base station, in accordance with certain aspects of the present disclosure.

FIG. 7 illustrates example operations that may be performed by a relay node to send a resource status update message to a target base station, in accordance with certain aspects of the present disclosure.

At 702, the relay node may generate a report message (e.g., resource status update message). At 704, the relay node may determine whether or not to include one or more parameters in the report message that are calculated based on information not available at the relay node. For example, the relay node may fill up the report message with partial information that is available at the relay node. As an alternative, the relay node may leave some of the fields of the report message empty. At 706, the relay node may transmit the report message to the donor base station.

Thus, the techniques provide herein may allow a target base station to receive more accurate and complete information from a relay node than previously possible. The proposed techniques may have system-wide benefits, such as improved load balancing. As a result, the MLB algorithm and resource status reporting may be utilized in scenarios involving relay nodes, which may help in designing self-organizing networks that include relay nodes.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

The invention claimed is:

1. A method for wireless communications, comprising:
   intercepting a report message from a relay node destined for a target base station;
   modifying the report message from the relay node by adding missing information to the report message, wherein the missing information is not available at the relay node; and
   sending the modified report message to the target base station.

2. The method of claim 1, wherein adding the missing information to the report message comprises:
   including backhaul related loading information in the report message.

3. The method of claim 1, wherein modifying the report message comprises:
   modifying one or more values in the report message.

4. The method of claim 3, wherein modifying the one or more values in the report message comprises:
   filling up an S1 Transport Network Layer (TNL) Load Indicator field in a status report message.

5. The method of claim 1, wherein the report message comprises a status report message transmitted over a wireless backhaul link from the relay node.

6. A method for wireless communications, comprising:
   generating a report message at a relay node;
   determining whether or not to include one or more parameters in the report message for addition of missing information relating to the one or more parameters by a donor base station, wherein the missing information is not available at the relay node; and
   transmitting the report message to the donor base station.

7. The method of claim 6, wherein the one or more parameters comprise an S1 Transport Network Layer (TNL) Load Indicator in a status report message.

8. The method of claim 6, wherein the report message comprises a status report message transmitted over a wireless backhaul link from the relay node.

9. The method of claim 6, further comprising:
   filling up the one or more parameters with partial information that is available at the relay node.

10. An apparatus for wireless communications, comprising:
    means for intercepting a report message from a relay node destined for a target base station;
    means for modifying the report message from the relay node by adding missing information to the report message, wherein the missing information is not available at the relay node; and
    means for sending the modified report message to the target base station.

11. The apparatus of claim 10, wherein the means for adding the missing information to the report message comprises:
    means for including backhaul related loading information in the report message.

12. The apparatus of claim 10, wherein the means for modifying the report message comprises:
    means for modifying one or more values in the report message.

13. The apparatus of claim 12, wherein the means for modifying the one or more values in the report message comprises:
    means for filling up an S1 Transport Network Layer (TNL) Load Indicator field in a status report message.

14. The apparatus of claim 10, wherein the report message comprises a status report message transmitted over a wireless backhaul link from the relay node.

15. An apparatus for wireless communications, comprising:
    means for generating a report message at the apparatus;
    means for determining whether or not to include one or more parameters in the report message for addition of missing information relating to the one or more parameters by a donor base station, wherein the missing is not available at the apparatus; and
    means for transmitting the report message to the donor base station.

16. The apparatus of claim 15, wherein the one or more parameters comprise an S1 Transport Network Layer (TNL) Load Indicator in a status report message.

17. The apparatus of claim 15, wherein the report message comprises a status report message transmitted over a wireless backhaul link from the apparatus.

18. The apparatus of claim 15, further comprising:
    means for filling up the one or more parameters with partial information that is available at the apparatus.

19. A computer-program product for wireless communications, comprising a non-transitory computer readable medium having instructions stored thereon, the instructions being executable by one or more processors and the instructions comprising:
    instructions for intercepting a report message from a relay node destined for a target base station;
    instructions for modifying the report message from the relay node by adding missing information to the report message, wherein the missing information is not available at the relay node; and
    instructions for sending the modified report message to the target base station.

20. The computer-program product of claim 19, wherein the instructions for adding the missing information to the report message comprise:
    instructions for including backhaul related loading information in the report message.

21. The computer-program product of claim 19, wherein the instructions for modifying the report message comprise:
    instructions for modifying one or more values in the report message.

22. The computer-program product of claim 21, wherein the instructions for modifying the one or more values in the report message comprise:
    instructions for filling up an S1 Transport Network Layer (TNL) Load Indicator field in a status report message.

23. The computer-program product of claim 19, wherein the report message comprises a status report message transmitted over a wireless backhaul link from the relay node.

24. A computer-program product for wireless communications, comprising a non-transitory computer readable medium having instructions stored thereon, the instructions being executable by one or more processors and the instructions comprising:
   instructions for generating a report message at a relay node;
      instructions for determining whether or not to include one or more parameters in the report message for addition of missing information relating to the one or more parameters by a donor base station, wherein the missing information is not available at the relay node; and
   instructions for transmitting the report message to the donor base station.

25. The computer-program product of claim 24, wherein the one or more parameters comprise an S1 Transport Network Layer (TNL) Load Indicator in a status report message.

26. The computer-program product of claim 24, wherein the report message comprises a status report message transmitted over a wireless backhaul link from the relay node.

27. The computer-program product of claim 24, further comprising:
   instructions for filling up the one or more parameters with partial information that is available at the relay node.

28. An apparatus for wireless communications, comprising at least one processor configured to:
   intercept a report message from a relay node destined for a target base station,
      modify the report message from the relay node by adding missing information to the report message, wherein the missing information is not available at the relay node, and
   send the modified report message to the target base station; and
   a memory coupled to the at least one processor.

29. The apparatus of claim 28, wherein the at least one processor configured to add the missing information to the report message is further configured to include backhaul related loading information in the report message.

30. The apparatus of claim 28, wherein the at least one processor configured to modify the report message is further configured to modify one or more values in the report message.

31. The apparatus of claim 30, wherein the at least one processor configured to modify the one or more values in the report message is further configured to fill up an S1 Transport Network Layer (TNL) Load Indicator field in a status report message.

32. The apparatus of claim 28, wherein the report message comprises a status report message transmitted over a wireless backhaul link from the relay node.

33. An apparatus for wireless communications, comprising at least one processor configured to:
   generate a report message at the apparatus,
      determine whether or not to include one or more parameters in the report message for addition of missing information relating to the one or more parameters by a donor base station, wherein the missing information is not available at the apparatus, and
   transmit the report message to the donor base station; and
   a memory coupled to the at least one processor.

34. The apparatus of claim 33, wherein the one or more parameters comprise an S1 Transport Network Layer (TNL) Load Indicator in a status report message.

35. The apparatus of claim 33, wherein the report message comprises a status report message transmitted over a wireless backhaul link from the apparatus.

36. The apparatus of claim 33, wherein the at least one processor is further configured to fill up the one or more parameters with partial information that is available at the apparatus.

* * * * *